United States Patent

[11] 3,610,414

| [72] | Inventor | Harold Zumalt |
| | | Yazoo City, Miss. |
| [21] | Appl. No. | 791,631 |
| [22] | Filed | Jan. 16, 1969 |
| [45] | Patented | Oct. 5, 1971 |
| [73] | Assignee | Mississippi Chemical Corporation |
| | | Yazoo City, Miss. |

[54] CRUSHING AND SCREENING APPARATUS FOR SCREENING PARTICULATE MATERIAL CONTAINING FRANGIBLE LUMPS
5 Claims, 6 Drawing Figs.

[52] U.S. Cl. ............................................. 209/283, 209/255, 209/262, 209/389, 241/90
[51] Int. Cl. ......................................... B07b 1/00
[50] Field of Search ........................................... 209/283, 255, 464, 245, 247, 379, 262, 389; 241/73, 90, 68, 247

[56] References Cited
UNITED STATES PATENTS

| 546,749 | 9/1895 | Urie | 209/283 |
| 888,827 | 5/1908 | Laverty | 209/283 |
| 2,141,691 | 12/1938 | Kirby | 209/283 |
| 2,555,066 | 5/1951 | Thomas | 209/283 |
| 2,661,664 | 12/1953 | Baxter | 209/283 |

FOREIGN PATENTS

| 538,082 | 4/1956 | Italy | 241/90 |

Primary Examiner—Frank W. Lutter
Assistant Examiner—Ralph J. Hill
Attorney—Oblon, Fisher & Spivak ABSTRACT: Prilled and granular fertilizer and other particulate materials containing frangible lumps and foreign material can be screened at high rates in a hopper having V-shaped screen mounted therein through which the particulate fertilizer passes, the screen having a hemicylindrically shaped bottom portion forming a depressed trough in which is axially mounted a screw conveyor which conveys fertilizer in the trough toward one wall of the hopper, the edge of the blade of the screw being proximate the inner surface of the trough, so that lumps in the fertilizer are crushed between the edge of the blade of the screw and the inner surface of the trough, with a cam being mounted on the shaft of the conveyor near the wall of the hopper toward which the fertilizer in the trough is conveyed, with its free end terminating near the inner surface of the trough, which lifts out of the trough foreign material conveyed to the cam, thereby preventing the conveyor from becoming clogged.

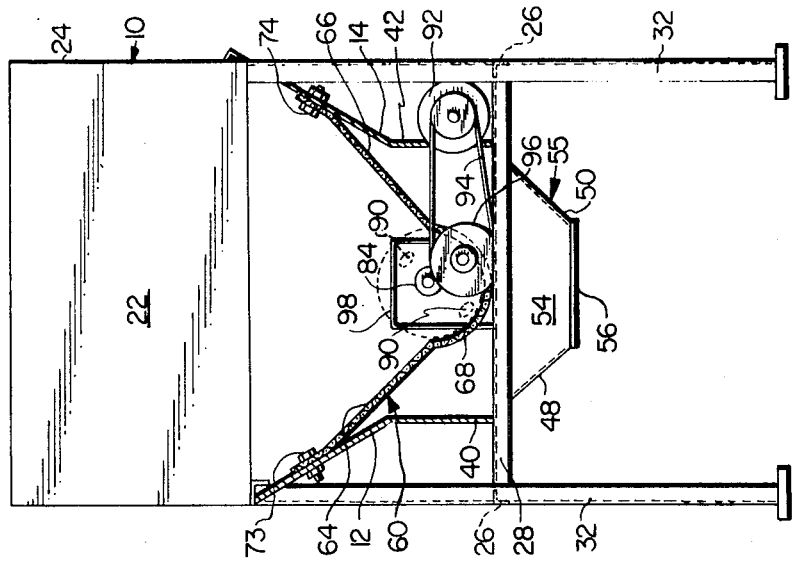
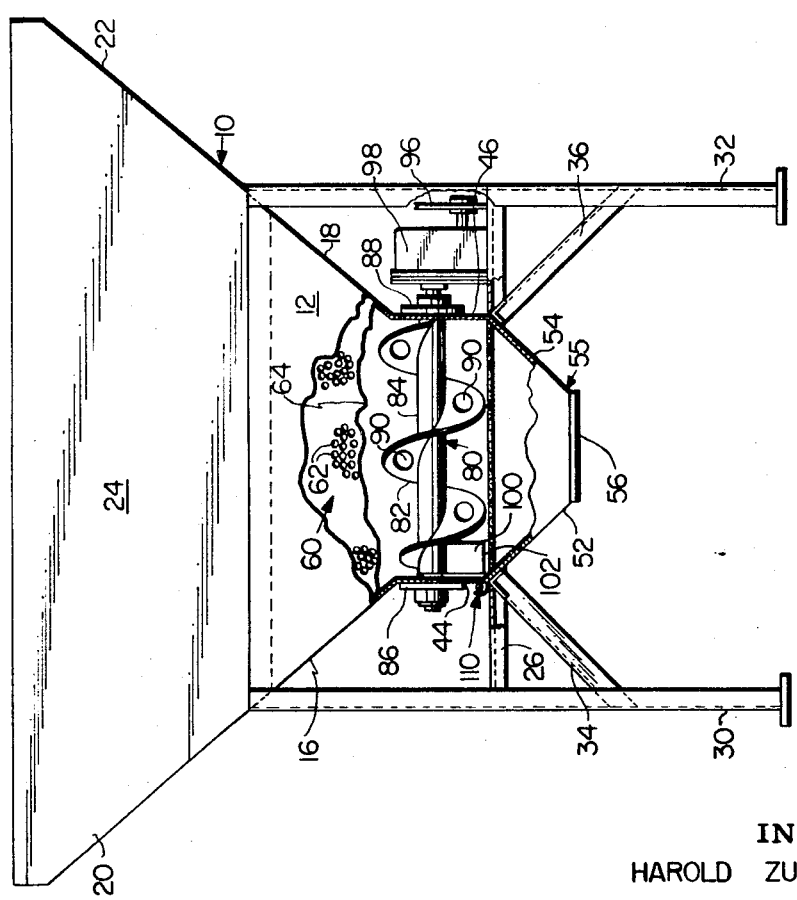

INVENTOR
HAROLD ZUMALT

BY

ATTORNEY

CRUSHING AND SCREENING APPARATUS FOR SCREENING PARTICULATE MATERIAL CONTAINING FRANGIBLE LUMPS

This invention relates to an apparatus for screening particulate material containing larger frangible lumps thereof and/or foreign material, and more particularly to an apparatus for screening prilled and granular fertilizer which crushes lumps therein and also collects any foreign material therein in a manner which prevents damage to the apparatus and easy removal therefrom.

BACKGROUND OF INVENTION

A longstanding problem in the solid fertilizer industry has been the tendency of stored solid fertilizer to cake, thereby forming lumps therein. In order that such fertilizer can be used in conventional spreading equipment, these lumps must be eliminated by a screening operation so that the fertilizer will pass through the fertilizer spreader. A large, cumbersome and expensive apparatus conventionally used for this purpose comprises a bucket elevator, which lifts the fertilizer material from the storage area and deposits it onto vibrating screens. These screens permit the particulate fertilizer to pass through but divert caked material or lumps to a separate collection point. The lumps are then transferred to a lump crusher where they are broken up in a separate operation which also produces fines and dust. The crushed material is then returned to the bucket elevator to be again screened and mixed with on-size material or returned to the plant for reprocessing. Due to the complexity and number of moving parts, such equipment is very expensive, often costing $40,000 or more. It is heavy and incapable of transportation as an entire unit. Frequently a separate building is required to house the apparatus. The inherent corrosive nature of fertilizer makes the apparatus expensive to maintain. Also, problems are experienced in the operation of such screening equipment. Foreign objects, such as bolts and the like, in the fertilizer pass through the lump crusher, often causing serious and expensive damage thereto. Equally serious, the resulting downtime often occurs when fertilizer demand is at its peak, thus interfering with delivery when the need is greatest. In an effort to limit such damage, constant supervision by maintenance personnel is required, thus adding to the expense.

OBJECTS OF THE INVENTION

It is an object of the present invention to provide an apparatus for screening particulate material and for crushing lumps therein during the screening operation.

Another object is the provision of such apparatus which is economical and trouble free in operation.

Another object is the provision of such apparatus which produces a minimum amount of fines during the crushing and screening operation.

Another object of this invention is the provision of an apparatus for screening granular and prilled fertilizer and other particulate materials containing foreign material, such as paper and metallic objects, e.g. bolts and the like.

Another object is the provision of such apparatus having a minimum number of moving parts which are exposed to the material being screened.

Another object is to provide such apparatus which accomplishes the screening and crushing in one rapid and continuous operation.

Another object is to provide such an apparatus as an inexpensive, portable structure.

Another object is to provide an apparatus that requires a minimum of operating and maintenance labor.

A further object of the invention is to provide an apparatus for screening and crushing granular and prilled fertilizer at a fraction of the cost of construction and operation of conventional equipment.

Other objects of the invention will be apparent to those skilled in the art.

DESCRIPTION OF INVENTION

The fertilizer crusher and screener of this invention comprises a hopper structure, having sloping end and side walls, open at the top and narrowing at the bottom to form a discharge opening. Mounted therein by its upper edges to two opposing side walls of the hopper is a V-shaped screen extending to the end walls of the hopper and inwardly from the side walls, whose openings permit the particulate material being screened to pass through but which retains lumps thereof and foreign material. The bottom of the screen is hemicylindrically shaped and forms a trough whose circumference conforms closely to that of the flight of a driven screw conveyor positioned axially therein and extending the length of the hopper. The conveyor conveys the material in the trough portion of the screen toward one end of the hopper. The flight of the screw conveyor contains cutouts which permit particulate material and smaller lumps therein to flow therethrough. The ends of the shaft of the screw conveyor are mounted in the end walls of the hopper. One end of the shaft extends through the end wall of the hopper and is connected, via a speed reducer and V-belt to a driving motor. The end of the screw flight toward which the particulate material is conveyed terminates short of the end wall. Mounted perpendicularly and axially on the shaft, in the space between the end wall and end of the screw flight, is a paddle-shaped clearing element whose free end extends to the inner face of the hemicylindrically shaped portion of the screen so as to be in sliding relationship therewith as the shaft of the screw conveyor rotates, thereby lifting foreign material and any remaining lumps therein up from the trough portion of the screen so as to prevent clogging, binding or jamming of the conveyor. The portion of the hopper below the screen slants inwardly to form a collection hopper with an opening at its bottom for collecting the fertilizer which passes through the screen.

In the accompanying drawings, in which an embodiment of the invention is illustrated, FIG. 1 is front elevation of the crusher-screener, with a portion of its forward side wall and the forward side of screen plate behind it broken away to show the conveyor mechanism, shown with its driving means in perspective;

FIG. 2 is a side elevation of the crusher-screener;

Figure 3:
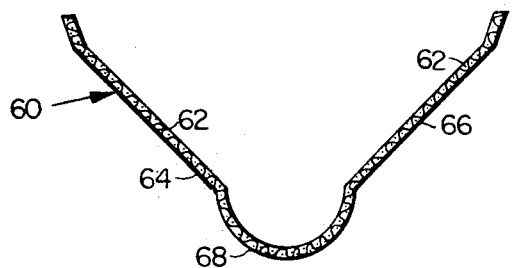
FIG. 3 is an end elevation of the screen plate.

Referring to FIGS. 1 and 2 of the drawings, a screening and crushing plate steel hopper generally designated 10 is shown having sloping side walls 12 and 14 and end walls 16 and 18. The end walls and the rear side wall 14 have extenders 20, 22 and 24, respectively, to prevent spillage when the fertilizer is fed from the front. Hopper 10 is mounted on a frame formed by two pairs of horizontal angle iron supports 26 and 28 and two pairs of vertical angle iron legs 30 and 32. Two pairs of braces 34 and 36 join the legs 30 and 32 to the horizontal support 26. Inwardly sloping sidewalls 12 and 14 and end walls 16 and 18 have vertical portions 40, 42, 44 and 46, respectively, at the conveyor section, below which they again slope inwardly to form the four sides 48, 50, 52 and 54, respectively, of a discharge structure 55 having a removable closure plate 56 slidably mounted on the bottom edges thereof.

Figure 4:
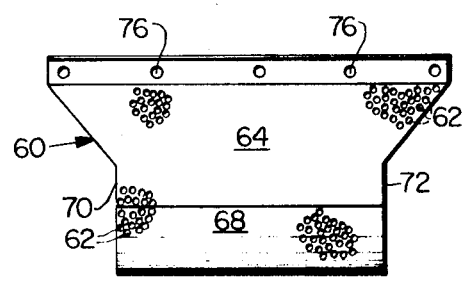
FIG. 4 is a front elevation of the screen plate with only a portion of the perforations in the face thereof forming the screening surface being shown.

A V-shaped screen plate 60, also shown in FIGS. 3 and 4, having a multiplicity of perforations 62 over its entire surface which extend through the plate and comprising 50 percent or more of its surface area, is shaped to provide a pair of flat sidewall screens 64 and 66 and a hemicylindrical, trough-shaped bottom screen 68. The upper portions of end edges 70 and 72 of screen plate 60 slant outwardly and the bottom portions thereof are vertical to conform to the contour of the inwardly slanting upper portions of end walls 16 and 18 and the vertical bottom portions 44 and 46 thereof. Screen plate 60 is mounted to side walls 12 and 14 of the hopper by a plurality of bolts 73 and 74 which pass through bolt holes 76 in side wall screens 64 and 66 and corresponding holes in side walls 12 and 14.

Screw conveyor 80 is axially positioned in the hemicylindrical, trough-shaped bottom screen 68 of screen plate 60, which is shaped to conform closely to the flight 82 thereof mounted on shaft 84 thereof which passes through end walls 16 and 18. Seals 86 and 88 and ball bearings (not shown) provide rotatable mountings for shaft 84. A plurality of oval openings 90 are provided in the flight of the screw conveyor, which is driven by motor 92 through a V-belt 94, pulley 96 and speed reduction gearbox 98.

Perpendicularly and axially mounted at one end of the shaft proximate the inside face of end wall 16, is a rectangular paddle-shaped clearing element 100 whose free end 102 extends proximate the inner surface of bottom screen 68 of screen plate 60 and which acts as a clearing device to prevent foreign material or hard, unbroken lumps from clogging or binding conveyor 80.

Figure 6:
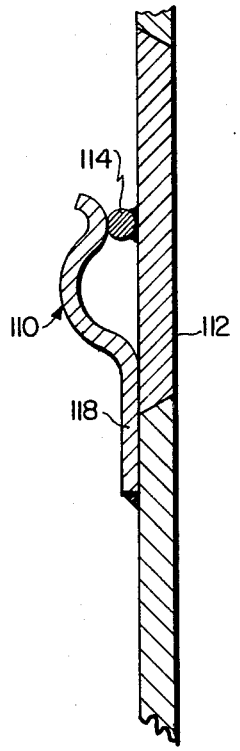
FIG. 6 is a transverse section of the cleanout gate and end wall fragment of FIG. 6 taken along line 6—6 of FIG. 5.
Figure 5:
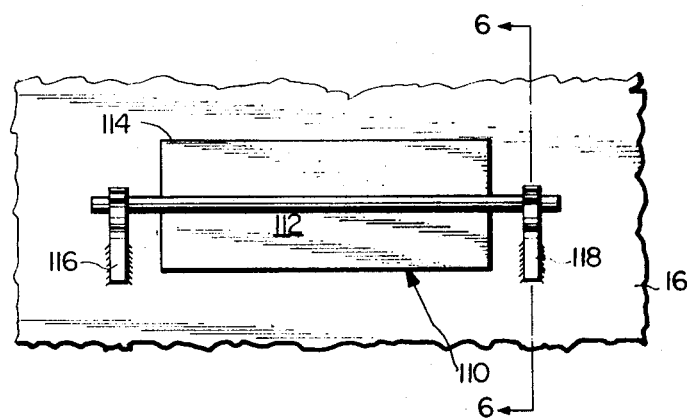
FIG. 5 is a front view of the cleanout gate showing an enlarged fragment of the end wall of the crusher-screener to which it is mounted.

Cleanout gate 110, shown in detail in FIGS. 5 and 6, is a rectangular plate 112 having a rod 114 horizontally mounted on its exterior face proximate its upper edge. The ends of rod 114 extend beyond the end edges of plate 112 for engagement with clips 116 and 118 whose bottom ends are mounted on end wall 16 below shaft 84 of screw conveyor 80. The edges of plate 112 are beveled to conform to the contour of similarly beveled edges of the opening in end wall 16 into which the cleanout plate 112 is mounted, thereby permitting rapid repositioning of the cleanout plate after its removal for removing accumulated foreign material.

In operation, closure plate 56 is adjusted to provide an opening which gives the desired discharge rate and fertilizer is fed into the hopper 10, e.g. by a payloader (not shown). On-size material flows by gravity through openings 62 in sidewall screens 64 and 66 and in bottom screen 68 of screen plate 60. The frangible lumps are scraped by the edge of screw flight 82 against the inside face of screen 68 until they are reduced in size sufficiently to fall between the flights along with smaller lumps which fall immediately through the flights. The lumps which drop into bottom screen 68 portion of screen plate 60 are conveyed toward end wall 16 where they are either crushed, forced back through openings 90 in flight 82, or lifted up from bottom screen 68 by clearing element 100, this process being repeated until all lumps are broken into particles small enough to pass through openings 62 in the screens. Any foreign material in the hopper which is conveyed to end wall 16 by conveyor 80 is prevented from jamming the conveyor by cam 100. Periodically, such foreign material is removed by cleanout gate 110. If this is done during a run, the fertilizer being conveyed by conveyor 80 will quickly force the foreign material out the opening in end plate 16 created by removing cleanout gate 110, which is then replaced. Fertilizer which falls through side wall screens 64 and 66 is diverted by side walls 48 and 50 of discharge structure 55 to the center thereof where it falls through the opening therein for removal.

In a typical run granular ammonium phosphate was passed through a crusher and screener having a screen plate 60 formed of a single sheet of screen having 7/16-inch openings, the side screen portions 64 and 66 thereof each being approximately 1½ feet wide and 2½ feet long at their shortest length and 3½ feet long at their longest length, the hemicylindrical bottom screen 68 portion being 2½ feet long with a 6-inch diameter. The conveyor was driven at 50 r.p.m. by a 5 hp. 1,800 r.p.m. motor. The fertilizer which was screened had been stored about two years and had set up so hard it had to be broken up with dynamite. Before screening it contained lumps as large as 2 feet by 3 feet. All lumps in 1,000-pound loads of fertilizer were broken up and the fertilizer was screened in ten seconds. Paper and other foreign material in the fertilizer did not clog the conveyor and was readily removed without interrupting the screening operation through the cleanout gate 110 when enough had collected to warrant doing so.

What is claimed is:

1. Apparatus for screening particulate material, such as fertilizer, containing larger frangible lumps and foreign material, comprising a hopper structure having a pair of inwardly sloping sides and a pair of inwardly sloping end walls forming a hopper-shaped reservoir for the particulate material open at the top; a generally V-shaped screen positioned within the reservoir, through which the particulate material passes, whose side walls form flat screens slanting inwardly from the side walls of the hopper, the upper edges of the screen being mounted on the side walls of the hopper and the side edges of the screen abutting the end walls of the hopper, and whose bottom is a hemicylindrical trough-shaped bottom screen; a screw conveyor comprising a helical blade mounted on a driven shaft, axially positioned in the bottom screen with the edge of the helical blade being proximate the inner surface of the bottom screen, whereby frangible lumps in the particulate material are crushed by the movement of the helical blade; rotating clearing means mounted perpendicularly on the shaft at the end thereof adjacent the end wall of the reservoir toward which the helical blade is canted and having a free end which terminates proximate the inner surface of the hemicylindrical trough-shaped screen, which lifts foreign material and particulate material conveyed to the clearing means by the conveyor from the trough-shaped portion of the screen as the conveyor rotates, thereby preventing clogging of the conveyor; and driving means for rotating the conveyor.

2. Apparatus according to claim 1 wherein the helical blade has a plurality of openings therein of a size which permits frangible lumps in the particulate material to flow therethrough.

3. Apparatus according to claim 1 wherein the sides and the hemicylindrically shaped bottom portion of the screen are formed from a shaped single piece of screen plate.

4. Apparatus according to claim 2 having a cleanout door in the end wall adjacent the clearing means, and wherein the clearing means is a rectangular, axially mounted cam.

5. Apparatus according to claim 2 wherein the conveyor and the clearing means mounted thereon are the only moving parts within the apparatus.